United States Patent [19]
Eykamp

[11] 3,882,611
[45] May 13, 1975

[54] DRYER FOR FORAGE AND LIKE MATERIALS AND METHOD

[76] Inventor: Roy Donald Eykamp, Medway, Quirindi, New South Wales, Australia, 2343

[22] Filed: Jan. 3, 1974

[21] Appl. No.: 430,551

[30] Foreign Application Priority Data
Jan. 5, 1973 Australia............................ 1816/73

[52] U.S. Cl............................. 34/15; 34/17; 34/92
[51] Int. Cl.............................................. F26b 5/04
[58] Field of Search........................... 34/15, 17, 92

[56] References Cited
UNITED STATES PATENTS
66,428    7/1867    Walker................................. 34/17
2,858,795  11/1958   Walker................................. 34/92

*Primary Examiner*—John J. Camby
*Attorney, Agent, or Firm*—LeBlanc & Shur

[57] ABSTRACT

A method of drying grass and other forage materials consists in feeding the forage into a tubular trunk and compressing it so that it forms a substantially air-tight plug within the trunk, advancing this plug into a vacuum chamber of enlarged transverse dimensions so to loosen the matters constituting the plug, subjecting the loosened material to a vacuus suction while it is in the chamber, then discharging the material, into a second tubular trunk; again compressing the material within said second trunk so that it approaches an outlet end of that trunk as a second substantially air-tight plug therein, and simultaneously advancing said second plug towards the outlet end of the second trunk for discharge therefrom. The forage material in said vacuum chamber is preferably treated en route therethrough so to encourage evaporation of moisture therefrom.

10 Claims, 4 Drawing Figures

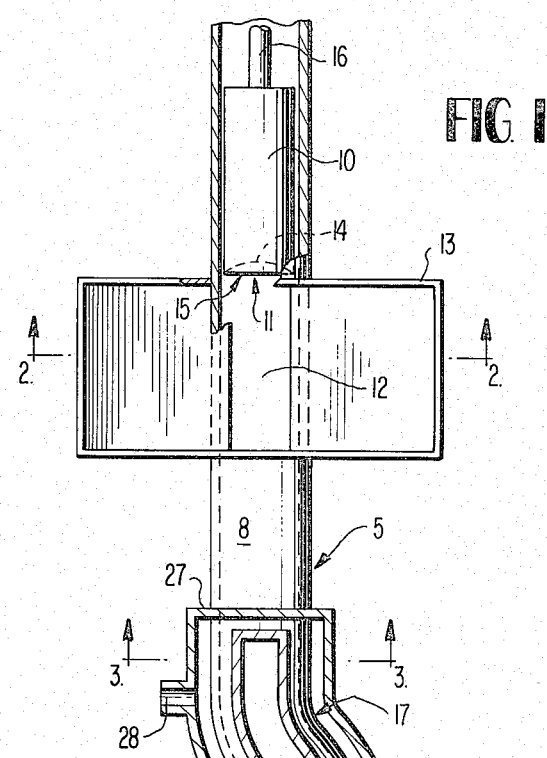
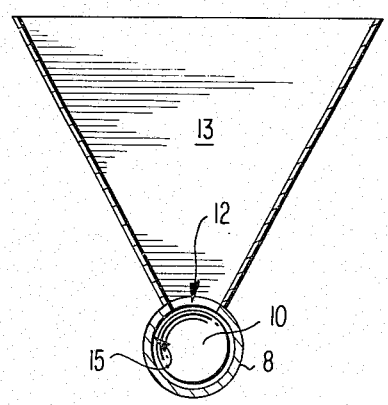
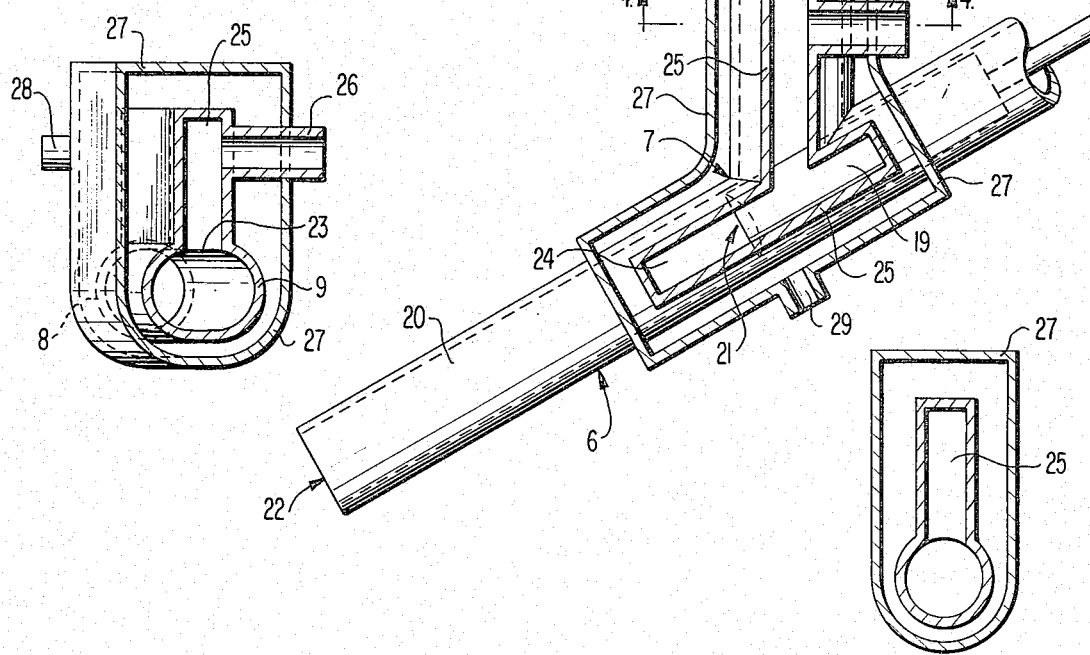

DRYER FOR FORAGE AND LIKE MATERIALS AND METHOD

This invention relates to the drying of grass, vegetable matters and other green forage material, for eventual use as animal fodder or as starting material for the production of proteinous matter for human consumption, and other moisture-containing particulate materials required to be in dried condition. Such materials are referred to herein simply as "forage."

The object of the invention is to provide simple apparatus with which wet, green or other moisture-laden forage may be rapidly dried by what is virtually a continuous process.

An example of apparatus for performing the invention is illustrated in the drawings herewith.

FIG. 1 is a sectional plan of the apparatus.

FIGS. 2, 3 and 4 are sectional and elevations respectively taken on line 2 — 2, 3 — 3 and line 4 — 4 in FIG. 1.

Referring to the drawings, the apparatus there shown mainly consists of two tubular trunks 5 and 6, one of which (5) has one end opening sidewardly into the other, being angularly disposed relative thereto as shown.

Trunk 5 consists of two parts, an upstream compacting tube 8, and, a downstream vacuum tube in chamber 9, co-extensive with tube 8. Tube 8 may be regarded as that part of trunk 5 shown above line 3 — 3 in FIG. 1, and tube 9 that part of trunk 5 extending from line 3 — 3 to the trunk end 7.

Compacting tube 8 houses a reciprocatable piston-like plunger 10 the working end 11 of which is able to sweep past a forage inlet aperture 12 which opens sidewardly of tube 8 and constitutes the bottom opening of a forage receiving hopper 13 or other means whereby forage to be dried may be fed into tube 8.

The end 11 of plunger 10 is preferably concave, as indicated at 14, so to provide the plunger with a circumferential knife edge 15. Thus the plunger is not only able to thrust forage along tube 8 (towards tube 9) but is also able to shear much of the incoming forage thereby to fragment it so to facilitate subsequent extraction of moisture therefrom.

Plunger 10 may be reciprocated in any convenient way. For example, by having the rod 16 on which it is mounted furnished with a cross-head, coupled by way of a connecting-rod (not shown) to a motor-driven crank-shaft or the like. The stroke of plunger 10 is preferably of such length as will ensure its end 11 being able to sweep across the entire axial length of aperture 12.

The "down-stream" portion of tube 8, being that part of it between aperture 12 and the beginning of vacuum chamber 9, is of such axial length as will suffice for forage compacted therein to constitute a dense stopper or plug which virtually air-tightly fills the mentioned down-stream portion of tube 8. In experimental operation of the apparatus, it has been found that this dense stopper or plug is so tight fitting within tube 8 as to be movable therealong only by continued addition of forage, by way of aperture 12, and sustained reciprocation of plunger 10.

The vacuum chamber 9 into which tube 8 opens throughout all or most of its length, is larger in its lateral cross-sectional area than is tube 8 so that densely packed forage, upon arrival in chamber 9, of its own accord, becomes less dense and hence more amendable to vacuum drying.

The vacuum chamber 9 may be straight; but for preference it has one or more bends in its, as indicated at 17 and 18, as experiment has shown that the provision of such bends facilitates break up of the dense forage arriving from the compacting tube 8.

The forage departure end 7 of tube 9 opens sidewardly into the second trunk 6. This trunk is much the same as trunk 5 except that it is not necessary for it to have a portion of enlarged cross-sectional area, neither is it necessary to provide it with bends such as those marked 17 and 18.

Trunk 6 is furnished with a piston-like plunger 19 which may be virtually the same as, and operated in the way as, plunger 10 in compacting tube 8.

Plunger 19 is able to sweep past opening 7 thus the transfer forage from tube 9 into the departure end portion 20 of trunk 6. As before, the working end 21 of plunger 19 is preferably sharpened so that it acts as a shear to increase fragmentation of through-going forage.

The operation of plunger 19 is such that the forage in tube portion 20 is densified and thus formed into a second substantially fluid-tightly fitting plug. If desired tube portion 20 may have in it, a portion of reduced cross-sectional area so to assist in densification of the through-going forage. It is presently considered, however, that such a reduction area is not essential, as frictional resistance to advancement of the forage along portion 20 suffices for formation of the mentioned second plug. The treated forage is discharged from the open end 22 of portion 20 where it may be collected in any convenient matter for direct use as animal fodder or other treatment or use as may be desired.

While the forage is in the tube 9 and preferably also while it is in that portion of trunk 6 in the vicinity of plunger 19, it is subjected to a vacuus suction to expedite drying.

To this end, pipe 9 has an elongated top port 23 which, for preference branches into a similar top port 24 for part of the trunk 6. These ports open into a Leader chamber 25 furnished with one or more vapor take-off outlets 26. Outlet 26 is pipe-connected to the intake side of an ordinary vacuum pump (not shown) in conventional manner.

It will be appreciated that if the vacuus suction iis effectively maintained and if the tube portions subject to that suction are sufficiently long, effective forage drying may be carried out without necessity for heating the forage. It is preferred, however, to heat the forage under vacuus suction so to hasten drying and reduce the overall dimensions of the apparatus.

To perform this heating, the parts of tube 9 and trunk 6 under vacuum, and preferably also Leader chamber 25, are wholly encased within a heating jacket 27. This jacket has unions 28 and 29 one of which is pipe-connected to a source of heating fluid such as hot gas, steam heated liquid or the like. The other union may simply drain to waste or it may be connected to a return pipe for re-heating of used fluid.

I claim:

1. A method of drying forage comprising the steps of: depositing forage to be dried into a first conduit, compressing the forage in the first conduit to form a compacted mass of forage in substantial fluid-tight sealing relation about the first conduit, advancing the compacted mass along the first conduit into a vacuum chamber, diffusing the compacted mass in the vacuum chamber, introducing a sub-atmospheric pressure in the vacuum chamber, advancing the diffused mass along the vacuum chamber, repeatedly removing portions of the diffused mass from the leading end thereof as the diffused mass advances through the vacuum chamber, delivering the removed portions of the diffused mass to a second conduit in communication with the first conduit through the vacuum chamber, compressing the removed mass portions in the second conduit to form a second compacted mass of forage in substantial fluid-tight sealing relation about the second conduit whereby the vacuum chamber is substantially sealed by the fluid-tight substantial sealing engagement of the first and second compacted masses in their respective first and second conduits, and advancing the second compacted mass along the second conduit to a discharge remote from the vacuum chamber.

2. A method according to claim 1 including heating the diffused mass of forage in the vacuum chamber.

3. A method according to claim 1 including changing the direction of travel of the forage along the first conduit to diffuse the forage.

4. Forage drying apparatus comprising:

a first tubular conduit including an upstream compacting tube and a downstream vacuum chamber, the lateral cross-sectional area of said vacuum chamber being greater than the cross-sectional area of said compacting tube, a second tubular conduit coupled to said first conduit and in communication with the downstream end of said vacuum chamber, said second conduit having a discharge, means for feeding forage to be dried into said compacting tube, means carried by said first conduit for compacting forage in said compacting tube thereby to seal said first conduit with the compacted forage and for advancing the compacted forage into and through said vacuum chamber, means carried by said second conduit for recompacting the forage received therein from the vacuum chamber thereby to seal said second conduit with the recompacted forage and for advancing such forage toward said discharge, and means for establishing and maintaining a sub-atmospheric pressure in said vacuum chamber between the seals formed in the first and second conduits.

5. Apparatus according to claim 4 including means for heating said vacuum chamber.

6. Apparatus according to claim 5 wherein said heating means includes a jacket which at least partially encases said vacuum chamber and part of said second conduit, and means for communicating heating fluid to said jacket.

7. Apparatus according to claim 4 wherein said vacuum chamber has at least one bend in it thereby to deflect the forage advanced through said chamber.

8. Apparatus according to claim 4 wherein said forage feeding means includes a forage intake aperture in the side of said first tube, and wherein said first compacting means includes a reciprocable piston-like plunger in said compacting tube having a peripherally sharpened working end face to sweep in shear relation across said aperture.

9. Apparatus according to claim 4 wherein said vacuum chamber includes an outlet aperture to said second conduit, said second compacting means including a reciprocable piston-like plunger in said second conduit having a peripherally sharpened working end face able to sweep in shear relationship across said aperture.

10. Apparatus according to claim 4 wherein the last mentioned means includes a housing defining an elongated Leader chamber, means providing for communication between said vacuum chamber and said second conduit including a first port extending longitudinally of said vacuum chamber and a second port extending longitudinally of said second conduit, and an outlet in communication with said leader chamber and adapted for connection with the intake of a vacuum pump.

* * * * *